United States Patent [19]

Kakiuchi et al.

[11] Patent Number: 4,683,257

[45] Date of Patent: Jul. 28, 1987

[54] RUBBER COMPOSITIONS FOR SOLID GOLF BALLS

[75] Inventors: Shinichi Kakiuchi, Kodaira; Tasuku Saito; Seisuke Tomita, both of Tokorozawa, all of Japan

[73] Assignee: Bridgestone Corporation, Tokyo, Japan

[21] Appl. No.: 872,879

[22] Filed: Jun. 11, 1986

[30] Foreign Application Priority Data

Jun. 12, 1985 [JP] Japan .................................. 60-125968

[51] Int. Cl.$^4$ ...................... A63B 37/00; A63B 37/06; C08K 3/20; C08L 9/00
[52] U.S. Cl. .................................... 524/432; 273/218; 524/908; 525/193; 525/236
[58] Field of Search ................ 525/193, 236; 524/908, 524/432; 273/218

[56] References Cited

U.S. PATENT DOCUMENTS 4,483,537 11/1984 Hanada et al. ...................... 273/218
4,546,980 10/1985 Gendreau et al. .................. 524/908
4,561,657 12/1985 Tominaga et al. .................. 273/218

*Primary Examiner*—Allan M. Lieberman
*Attorney, Agent, or Firm*—Birch, Stewart, Kolasch & Birch

[57] ABSTRACT

Solid golf balls are formed from a molding composition comprising (1) a polybutadiene blend of (A) a polybutadiene synthesized using a nickel and/or cobalt base catalyst and having a Mooney viscosity of 70 to 100 with (B) less than 50 parts by weight of a polybutadiene synthesized using a lanthanide rare earth element base catalyst and having a Mooney viscosity of 30 to 90 or (C) 20 to 80 parts by weight of a polybutadiene synthesized using a nickel and/or cobalt base catalyst and having a Mooney viscosity of 20 to 50, the polybutadienes containing at least 40% of cis-1,4 bond, (2) a crosslinking agent such as acrylic and methacrylic acid, (3) an inorganic filler, and (4) an organic peroxide.

5 Claims, No Drawings

RUBBER COMPOSITIONS FOR SOLID GOLF BALLS

BACKGROUND OF THE INVENTION

This invention relates to a rubber composition for use in solid golf balls.

Solid golf balls are well known as including one-, two-, and three-piece golf balls. Most solid golf balls are formed of rubber compositions. Typical rubber compositions used in the forming of solid golf balls are comprised of polybutadienes which are synthesized using nickel or cobalt base catalysts and have at least 40% of cis-1,4 bonds and a Mooney viscosity $ML_{1+4}(100°\ C.)$ of up to 60 because of their milling characteristics and processability on an extruder.

It is also known that polybutadienes synthesized using lanthanide rare earth element base catalysts would find a potential use as a rubber component of solid golf ball-forming rubber compositions.

The former polybutadienes synthesized using nickel or cobalt base catalysts and having at least 40% of cis-1,4 bond and a Mooney viscosity of up to 60 provide satisfactory workability, but leave great room for improvement in resilience property. The latter polybutadienes synthesized using lanthanide rare earth element base catalysts have never been used in commercial products because of many problems in actual applications.

SUMMARY OF THE INVENTION

A primary object of the present invention is to provide a novel and improved solid golf ball-forming rubber composition which allows for the production of a solid golf ball having high resilience and improved initial speed.

The present invention is directed to a rubber composition for use in forming one-piece solid golf balls or the core of multiple solid golf balls including two- and three-piece solid golf balls, comprising (1) a polybutadiene having at least 40% of cis-1,4 bonds, (2) an unsaturated carboxylic acid and/or a salt thereof capable of producing crosslinking in the polybutadiene, (3) an inorganic filler, and (4) an organic peroxide. According to the feature of the invention, the polybutadiene (1) comprises 100 parts by weight of a blend of (A) a polybutadiene synthesized in the presence of a nickel and/or cobalt base catalyst and having a Mooney viscosity $ML_{1+4}(100°\ C.)$ of 70 to 100 and (B) less than 50 parts by weight of a polybutadiene synthesized in the presence of a lanthanide rare earth element base catalyst and having a Mooney viscosity $ML_{1+4}(100°\ C.)$ of 30 to 90 or (C) 20 to 80 parts by weight of a polybutadiene synthesized in the presence of a nickel and/or cobalt base catalyst and having a Mooney viscosity $ML_{1+4}(100°\ C.)$ of 20 to 50.

In the course of development of a solid golf ballforming rubber composition which has the advantages of improving the initial speed of the resulting solid golf ball and ease of working, we have found that a solid golf ball-forming rubber composition comprising as a sole rubber component (A) a polybutadiene synthesized in the presence of a nickel and/or cobalt base catalyst and having a Mooney viscosity $ML_{1+4}(100°\ C.)$ of 70 to 100 is fully effective in improving the initial speed of a solid golf ball. The rubber composition containing polybutadiene (A), however, has very poor milling characteristics on roll mills and very poor workability on extruder and molding equipment to meet commercial operational requirements. Unexpectedly, we have found that when (A) a polybutadiene synthesized in the presence of a nickel and/or cobalt base catalyst and having a Mooney viscosity of 70 to 100 is used in admixture with (B) a polybutadiene synthesized in the presence of a lanthanide rare earth element base catalyst in a certain proportion or with (C) a polybutadiene synthesized in the presence of a nickel and/or cobalt base catalyst and having a Mooney viscosity of 20 to 50 in a certain proportion, the resulting blend can avoid the reduced workability on kneaders and roll mills due to inferior knitting performance of mixed compounds encountered with the use of polybutadiene (A) alone. More particularly, although (A) a polybutadiene synthesized in the presence of a nickel and/or cobalt base catalyst and having a Mooney viscosity of 70 to 100 cannot be handled with the existing equipment because of worst roll workability during extrusion, the aforementioned polybutadiene blends of (A) and (B) or (C) are compatible with the existing equipment and have improved workability, resulting in increased productivity. Moreover, solid golf balls having cores formed of the polybutadiene blends of (A) and (B) or (C) show an increased initial speed which in turn, increases the flying distance of ball.

The above and other objects, features, and advantages of the present invention will be more apparent from the following description.

DETAILED DESCRIPTION OF THE INVENTION

As described above, the rubber composition for forming solid golf balls according to the present invention comprises (1) a polybutadiene having at least 40% of cis-1,4 bond, (2) an unsaturated carboxylic acid and/or a salt thereof capable of producing crosslinking in the polybutadiene, (3) an inorganic filler, and (4) an organic peroxide.

The polybutadiene (1) should be comprised of a blend of (A) a polybutadiene synthesized in the presence of a nickel and/or cobalt base catalyst and having a Mooney viscosity $ML_{1+4}(100°\ C.)$ of 70 to 100 and (B) a polybutadiene synthesized in the presence of a lanthanide rare earth element base catalyst and having a Mooney viscosity $ML_{1+4}(100°\ C.)$ of 30 to 90 or (C) a polybutadiene synthesized in the presence of a nickel and/or cobalt base catalyst and having a Mooney viscosity $ML_{1+4}(100°\ C.)$ of 20 to 50.

Polybutadienes (A) used herein should preferably contain at least 40%, especially at least 80% of cis-1,4 bonds and have a Mooney viscosity of 70 to 100.

Polybutadienes (A) may be prepared by polymerizing butadiene monomer in the presence of a nickel base catalyst, for example, one-component catalysts such as nickel on diatomaceous earth, two-component catalysts such as Raney nickel/titanium tetrachloride, and three-component catalysts such as nickel compound/organometal/trifluoroborate etherate. Examples of the nickel compounds used herein include reduced nickel on carrier, Raney nickel, nickel oxides, nickel carboxylate, and organic nickel complex salts. Examples of the organometals include trialkyl aluminums such as triethyl aluminum, tri-n-propyl aluminum, triisobutyl aluminum, and tri-n-hexyl aluminum; alkyl lithiums such as n-butyl lithium, sec.-butyl lithium, tert.-butyl lithium, and 1,4-butane dilithium; dialkyl zincs such as diethyl zinc and dibutyl zinc, and the like. Polymerization of butadiene in the presence of these catalysts is generally carried out by continuously charging a reactor with butadiene monomer along with a solvent such as aliphatic, aromatic and cycloaliphatic hydrocarbon solvents, and a catalyst such as nickel octanoate and triethyl aluminum and controlling the reaction temperature in the range of 5° to 60° C. and the reaction pressure in the range from one to several atmospheres, namely from atmospheric pressure to about 70 atmospheres such that a product having a predetermined Mooney viscosity may be obtained.

Cobalt base catalysts are also useful in the preparation of polybutadienes (A). Examples of the cobalt base catalysts used herein include elemental cobalt and cobalt compounds, for example, Raney cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyldithiocarbamate, cobalt anilinium nitrite, cobalt dinitrosyl chloride, etc. Particularly, combinations of these cobalt compounds with a dialkyl aluminum monochloride (e.g., diethyl aluminum monochloride and diisobutyl aluminum monochloride), a trialkyl aluminum (e.g., triethyl aluminum, tri-n-propyl aluminum, triisobutyl aluminum, and tri-n-hexyl aluminum), and aluminum chloride or with an alkyl aluminum sesquichloride (e.g., ethyl aluminum sesquichloride) and aluminum chloride are preferred catalysts for use in the preparation of polymers of cis-1,4 bond type. The process of preparing polybutadienes using the cobalt base catalysts is similar to that with the nickel base catalysts.

Polybutadienes (B) which are combined with polybutadienes (A) into the blends according to the present invention are those polybutadienes synthesized in the presence of a lanthanide rare earth element base catalyst, containing at least 40%, desirably at least 80% of cis-1,4 bonds, and having a Mooney viscosity $ML_{1+4}(100°\ C.)$ of 30 to 90.

Polybutadienes (B) may be prepared by polymerizing butadiene monomer in the presence of catalysts comprising a lanthanide rare earth element compound (to be simply referred to as a lanthanide compound, hereinafter), an organoaluminum compound, a Lewis base, and optionally, a Lewis acid. The lanthanide compounds used herein include halides, carboxylates, alcoholates, thioalcoholates, and amides of metals having atomic numbers of 57 to 71. The organoaluminum compounds used herein may be those having the general formula: $AlR^1R^2R^3$ wherein $R^1$, $R^2$, and $R^3$ are independently selected from hydrogen and hydrocarbon residues having 1 to 8 carbon atoms, and $R^1$, $R^2$, and $R^3$ may be the same or different.

The Lewis bases serve to convert the lanthanide compounds into complexes, and acetylacetone and ketone alcohols and the like may be used for this purpose.

The Lewis acids used include aluminum halides of the general formula: $AlX_nR_{(3-n)}$ wherein X is a halogen, R is a hydrocarbon residue (for example, hydrocarbon residues having 1 to about 20 carbon atoms such as alkyl, aryl, and aralkyl radicals), and n is equal to 1, 1.5, 2, or 3, and other metal halides such as silicon tetrachloride, tin tetrachloride, and titanium tetrachloride.

When butadiene is polymerized in the presence of the above-mentioned catalyst, the molar ratio of butadiene to lanthanide compound preferably ranges from $5 \times 10^2$ to $5 \times 10^6$, especially from $10^3$ to $10^5$, and the molar ratio of $AlR^1R^2R^3$ to lanthanide compound preferably ranges from 5 to 500, especially from 10 to 300. The preferred proportion of Lewis base to lanthanide compound is at least 0.5, and especially ranges from 1 to 20 in molar ratio. When a Lewis acid is used, the preferred proportion of halide in the Lewis acid to lanthanide compound ranges from 1 to 10, especially from 1.5 to 5 in molar ratio.

In the polymerization of butadiene, the lanthanide compound base catalysts may be used as solution in a suitable solvent such as n-hexane, cyclohexane, n-heptane, toluene, xylene, benzene, etc. or carried on suitable carriers such as silica, magnesia, and magnesium chloride.

Polymerization of butadiene may be carried out in a solvent such as n-hexane, cyclohexane, n-heptane, toluene, xylene, benzene, etc., or bulk polymerization without a solvent may also be employed. The polymerization temperature typically ranges from $-30°$ C. to 150° C., preferably from 10° C. to 80° C. The polymerization pressure may vary depending on other conditions.

When a blend of components (A) and (B) is used as the polybutadiene rubber composition (1) in the solid golf ball-forming rubber compositions of the present invention, components (A) and (B) are preferably blended such that more than 50 parts by weight to 90 parts by weight of (A) is present per 100 parts by weight of (A) and (B) combined. The most preferred proportion is 60 to 90 parts by weight of (A) and 40 to 10 parts by weight of (B) per 100 parts of (A) and (B) combined. Blends containing up to 50 parts by weight of (A) result in solid golf balls having less satisfactory resilience and hence, little increased initial speed whereas contents of more than 90 parts by weight of (A) in the blends render the resulting rubber compositions too hard in the necessary working or processing operations such as milling.

When a blend of components (A) and (C) is used as the polybutadiene rubber composition (1) in the solid golf ball-forming rubber compositions of the pesent invention, component (C) used is a polybutadiene which is prepared by polymerizing butadiene in the presence of a nickel and/or cobalt base catalyst as in the preparation of component (A) and contains at least 40%, preferably at least 80% of cis-1,4 bond and a Mooney viscosity of 20 to 50. The nickel and cobalt base catalysts used herein may be selected from the same catalysts as used in the synthesis of component (A). Polymerization may be effected under similar conditions as in the synthesis of component (A) except that the resulting polybutadiene may have a Mooney viscosity of 20 to 50.

Component (C) is preferably blended such that 80 to 20 parts by weight of (A) and 20 to 80 parts by weight of (C) are present per 100 parts by weight of (A) and (C) combined. The most preferred proportion is 70 to 30 parts by weight of (A) and 30 to 70 parts by weight of (C) per 100 parts of (A) and (C) combined. Blends containing less than 20% by weight of (A) result in solid golf balls having less satisfactory resilience and hence, little increased initial speed whereas contents of more than 80 parts by weight of (A) in the blends render the resulting rubber compositions too hard and hence, difficult to process such as by milling.

One-piece solid golf balls or solid cores of multiple solid golf balls including two- and three-piece solid golf balls are formed from the rubber compositions of the present invention by crosslinking and curing the polybutadiene blend therein with an unsaturated carboxylic acid and/or a salt thereof. To this end, the composition is rendered crosslinkable by incorporating the unsaturated carboxylic acid or salt and other ingredients such as inorganic filler and organic peroxide in suitable proportions. Preferred examples of the unsaturated carboxylic acids and salts which produce crosslinking in the polybutadienes include acrylic acid, methacrylic acid, and zinc salts thereof. The inorganic filler may be, for example, zinc oxide, barium sulfate, and silica. The organic peroxide may be, for example, dicumyl peroxide, 1,1-di-t-butylperoxy-3,3,5-trimethylcyclohexane, 2,5-dimethyl-2,5-di(t-butylperoxy)hexane, and 1,3-bis(t-butylperoxy-isopropyl)benzene. Illustrative examples of the rubber compositions include compositions comprising 100 parts by weight of the abovementioned polybutadiene blend, 10 to 60 parts by weight of an unsaturated carboxylic acid or a metal salt thereof, 10 to 70 parts by weight of an inorganic filler, and 0.1 to 6 parts by weight of a peroxide, and more preferably those compositions comprising 100 parts by weight of the abovementioned polybutadiene blend, 10 to 30 parts by weight of acrylic and/or methacrylic acid, 10 to 70 parts by weight of an inorganic filler such as zinc oxide, and 0.5 to 6 parts by weight of an organic peroxide; and those compositions comprising 100 parts by weight of the above-mentioned polybutadiene blend, 20 to 60 parts by weight of a metal salt of unsaturated carboxylic acid such as zinc acrylate and zinc methacrylate, 10 to 60 parts by weight of an inorganic filler (extending filler) such as zinc oxide, and 0.1 to 5 parts by weight of an organic peroxide. Preferred solid golf balls or solid cores may be obtained by heat curing these compositions although the present invention is not limited to them.

The cover that envelops the solid core formed from the rubber composition of the present invention to complete a multiple solid golf ball, typically a two- or three-piece solid golf ball may advantageously be formed from an ionomer resin base composition, for example, an ionomer resin in admixture with an inorganic filler such as titanium dioxide, zinc oxide, zinc stearate, magnesium stearate, etc. The preferred ionomer resins are those polymers obtained by polymerizing a monoolefin with one or more members selected from unsaturated mono- and dicarboxylic acids having 3 to 8 carbon atoms and esters thereof and having a bridging metal bond attached thereto. The cover may preferably have a thickness in the range from 0.5 to 2.7 mm although the exact thickness may be properly selected depending on the desired performance.

The golf balls may be fabricated so as to meet the ordinary standard specifications with respect to overall weight and size.

In forming solid cores or balls from the rubber compositions of the present invention, the cores or balls may be molded in a conventional manner, for example, by milling the above-mentioned materials of the rubber composition on a conventional mill such as a Banbury mixer or roll mill, compression or injection molding the composition in a mold having a cavity corresponding to the core or ball, and heating the molded product. The temperature used in curing purposes may be 120° to 180° C. when the rubber composition contains dicumyl peroxide as the peroxide. The method of covering the solid core with a cover is not particularly limited. One method is by placing the solid core in a pair of cover halves preformed in semispherical shape and thermoforming them into an integral ball. Alternatively, the cover composition may be injection molded over the solid core to form a core-cover integrated ball.

The rubber compositions of the present invention are rubber blends wherein (A) a polybutadiene synthesized in the presence of a nickel and/or cobalt base catalyst and having a Mooney viscosity of 70 to 100 is combined with (B) a polybutadiene synthesized in the presence of a lanthanide rare earth element base catalyst and having a Mooney viscosity of 30 to 90 or (C) a polybutadiene synthesized in the presence of a nickel and/or cobalt base catalyst and having a Mooney viscosity of 20 to 50, they exhibit improved workability on kneaders and roll mills due to knitting performance of mixed compounds. In addition to these processing advantages, they are also effective in improving the initial speed of solid golf balls having cores formed therefrom.

Examples of the present invention are given below by way of illustration and not by way of limitation.

EXAMPLES 1-6, COMPARATIVE EXAMPLES 1-4

Using various polybutadienes having the Mooney viscosity and cis-1,4 bond content reported in Tables 1 and 2, a series of rubber compositions consisting of 100 parts by weight of polybutadiene blend (total), 32 parts by weight of zinc acrylate, 17 parts by weight of zinc oxide, and 1.0 part by weight of dicumyl peroxide were kneaded by means of a Banbury mixer and a roll mill and then compression molded at 150° C. for 40 minutes into integral cores for the large size golf ball.

Thereafter, cover materials shown in Tables 1 and 2 are injection molded around the above-molded solid cores, yielding two-piece golf balls having physical properties as shown in Tables 1 and 2.

Table 1 contains the data of golf balls obtained using the core-forming rubber compositions according to the present invention (Examples). Table 2 contains those of golf balls prepared as comparative examples.

TABLE 1

| | Examples | | | | | |
|---|---|---|---|---|---|---|
| | 1 | 2 | 3 | 4 | 5 | 6 |
| Solid core | | | | | | |
| Composition, parts by weight | | | | | | |
| Polybutadiene 1*1 | 80 | 65 | 70 | 55 | 50 | 50 |
| Polybutadiene 2 | 20 | 35 | 30 | 45 | 0 | 0 |
| Polybutadiene 3 | 0 | 0 | 0 | 0 | 50 | 0 |
| Polybutadiene 4 | 0 | 0 | 0 | 0 | 0 | 50 |
| Zinc acrylate | 32 | 32 | 32 | 32 | 32 | 32 |
| Zinc oxide | 17 | 17 | 17 | 17 | 17 | 17 |
| Dicumyl peroxide | 1.0 | 1.0 | 1.0 | 1.0 | 1.0 | 1.0 |
| Mooney viscosity | | | | | | |
| Polybutadiene 1 | 90 | 90 | 75 | 75 | 90 | 90 |
| Polybutadiene 2 | 45 | 45 | 60 | 60 | — | — |
| Polybutadiene 3 | — | — | — | — | 28 | — |
| Polybutadiene 4 | — | — | — | — | — | 35 |
| Cis-1,4 bond content, % | | | | | | |
| Polybutadiene 1 | 96 | 96 | 95 | 95 | 96 | 96 |
| Polybutadiene 2 | 93 | 93 | 94 | 94 | — | — |
| Polybutadiene 3 | — | — | — | — | 94 | — |
| Polybutadiene 4 | — | — | — | — | — | 96 |
| Weight, grams | 34.2 | 34.3 | 34.2 | 34.2 | 34.3 | 34.2 |
| Hardness (100 kg distortion), mm | 2.8 | 2.8 | 2.9 | 2.9 | 2.9 | 2.9 |
| Cover | | | | | | |
| Composition, parts by weight | | | | | | |
| Ionomer*2 | 100 | 100 | 100 | 100 | 100 | 100 |
| Titanium dioxide | 2 | 2 | 2 | 2 | 2 | 2 |
| Thickness, mm | 2.2 | 2.2 | 2.2 | 2.2 | 2.2 | 2.2 |
| Ball physical properties | | | | | | |

TABLE 1-continued

|  | Examples | | | | | |
| --- | --- | --- | --- | --- | --- | --- |
|  | 1 | 2 | 3 | 4 | 5 | 6 |
| Weight, grams | 45.5 | 45.5 | 45.5 | 45.4 | 45.5 | 45.4 |
| Hardness (100 kg distortion), mm | 2.3 | 2.3 | 2.4 | 2.4 | 2.4 | 2.4 |
| Initial speed[*3], m/sec. | 65.9 | 65.8 | 65.8 | 65.7 | 65.9 | 65.8 |

Note:
[*1]Polybutadiene 1: prepared using an Ni base catalyst in the form of nickel octanoate/triethyl aluminum/trifluoroborate.
Polybutadiene 2: prepared using an Nd base catalyst in the form of neodymium octanoate/acetylactone/triethyl aluminum/diethyl aluminum chloride.
Polybutadiene 3: prepared using a Co base catalyst in the form of cobalt octanoate/diethyl aluminum chloride/triethyl aluminum.
Polybutadiene 4: prepared using an Ni base catalyst in the form of nickel octanoate/triethyl aluminum/trifluoroborate.
Polybutadiene 5: prepared using an Li base catalyst in the form of n-butyl lithium
[*2]trademark Surlyn 1706, manufactured by duPont
[*3]Initial speed is measured by hitting a ball in a T/T machine (a swing robot manufactured by True Temper Co.) with No. 1 wood club at a club head speed of 45 m/sec.

TABLE 2

|  | Comparative Examples | | | |
| --- | --- | --- | --- | --- |
|  | 1 | 2 | 3 | 4 |
| Solid core |  |  |  |  |
| Composition, parts by weight |  |  |  |  |
| Polybutadiene 1[*1] | 100 | 0 | 0 | 0 |
| Polybutadiene 2 | 0 | 0 | 100 | 0 |
| Polybutadiene 3 | 0 | 100 | 0 | 0 |
| Polybutadiene 5 | 0 | 0 | 0 | 100 |
| Zinc acrylate | 32 | 32 | 32 | 32 |
| Zinc oxide | 17 | 17 | 17 | 17 |
| Dicumyl peroxide | 1.0 | 1.0 | 1.0 | 1.0 |
| Mooney viscosity |  |  |  |  |
| Polybutadiene 1 | 44 | — | — | — |
| Polybutadiene 2 | — | — | 45 | — |
| Polybutadiene 3 | — | 44 | — | — |
| Polybutadiene 5 | — | — | — | 72 |
| Cis-1,4 bond content, % |  |  |  |  |
| Polybutadiene 1 | 96 | — | — | — |
| Polybutadiene 2 | — | — | 93 | — |
| Polybutadiene 3 | — | 94 | — | — |
| Polybutadiene 5 | — | — | — | 45 |
| Weight, grams | 34.4 | 34.4 | 34.3 | 34.3 |
| Hardness (100 kg distortion), mm | 2.9 | 2.8 | 2.7 | 2.9 |
| Cover |  |  |  |  |
| Composition, parts by weight |  |  |  |  |
| Ionomer[*2] | 100 | 100 | 100 | 100 |
| Titanium dioxide | 2 | 2 | 2 | 2 |
| Thickness, mm | 2.2 | 2.2 | 2.2 | 2.2 |
| Ball physical properties |  |  |  |  |
| Weight, grams | 45.6 | 45.5 | 45.4 | 45.5 |
| Hardness (100 kg distortion), mm | 2.4 | 2.3 | 2.3 | 2.4 |
| Initial speed[*3], m/sec. | 64.8 | 64.6 | 65.2 | 64.3 |

Note:
[*1]Polybutadiene 1: prepared using an Ni base catalyst in the form of nickel octanoate/triethyl aluminum/trifluoroborate.
Polybutadiene 2: prepared using an Nd base catalyst in the form of neodymium octanoate/acetylactone/triethyl aluminum/diethyl aluminum chloride.
Polybutadiene 3: prepared using a Co base catalyst in the form of cobalt octanoate/diethyl aluminum chloride/triethyl aluminum.
Polybutadiene 4: prepared using an Ni base catalyst in the form of nickel octanoate/triethyl aluminum/trifluoroborate.
Polybutadiene 5: prepared using an Li base catalyst in the form of n-butyl lithium
[*2]trademark Surlyn 1706, manufactured by duPont
[*3]Initial speed is measured by hitting a ball in a T/T machine (a swing robot manufactured by True Temper Co.) with No. 1 wood club at a club head speed of 45 m/sec.

As seen from the data in Tables 1 and 2, the solid golf balls (Examples) using the core-forming rubber compositions of the present invention are improved in resilience, and hence, increased in initial speed over the solid golf balls using the prior art core-forming rubber compositions.

EXAMPLE 7 AND COMPARATIVE EXAMPLE 5

Small size one-piece golf balls were prepared by milling the individual ingredients as shown in Table 3 in a Banbury mixer and a roll mill, and compression molding the milled compound at 150° C. for 40 minutes. The balls were determined for the same properties by the same procedure as in the preceding examples. The results are reported in Table 3.

TABLE 3

|  | Example 7 | Comparative Example 5 |
| --- | --- | --- |
| Composition, parts by weight |  |  |
| Polybutadiene 1[*1] | 80 | 100 |
| Polybutadiene 2 | 20 | 0 |
| Methacrylic acid | 22 | 22 |
| Zinc oxide | 26 | 26 |
| Barium sulfate | 18 | 18 |
| Dicumyl peroxide | 2.0 | 2.0 |
| Mooney viscosity |  |  |
| Polybutadiene 1 | 90 | 44 |
| Polybutadiene 2 | 45 | — |
| Cis-1,4 bond content, % |  |  |
| Polybutadiene 1 | 96 | 96 |
| Polybutadiene 2 | 93 | — |
| Ball physical properties |  |  |
| Weight, grams | 45.5 | 45.6 |
| Hardness (100 kg distortion), mm | 2.3 | 2.4 |
| Initial speed[*3], m/sec. | 64.9 | 64.0 |

[*1], [*3]see the footnotes of Tables 1 and 2

We claim:

1. A rubber composition, for use in forming one-piece golf balls or the core of multiple solid golf balls, comprising
   (1) a polybutadiene having at least 10% of cis-1,4 bond,
   (2) an unsaturated carboxylic acid and/or a salt thereof capable of producing crosslinking in the polybutadiene,
   (3) an inorganic filler, and
   (4) an organic peroxide,
   wherein said polybutadiene consists essentially of a blend of
   (A) a polybutadiene synthesized in the presence of a nickel and/or cobalt base catalyst and having a Mooney viscosity $ML_{1+4}(100°\ C.)$ or 70 to 100 and
   (B) a polybutadiene synthesized in the presence of a lanthanide rare earth element base catalyst and having a Mooney viscosity $ML_{1+4}(100°\ C.)$ or 30 to 90, and
   wherein said components (A) and (B) are blended such that more than 50 parts by weight to 90 parts by weight of said components (A) and less than 50 parts by weight to 10 parts by weight of said component (B) are present per 100 parts by weight of said blended components (A) and (B);
   or wherein said polybutadiene consists essentially of a blend of
   (A) a polybutadiene synthesized in the presence of a nickel and/or cobalt base catalyst and having a Mooney viscosity $ML_{1+4}(100°\ C.)$ or 70 to 100 and
   (C) a polybutadiene synthesized in the presence of a nickel and/or cobalt base catalyst and having a Mooney viscosity $ML_{1+4}(100°\ C.)$ of 20 to 50, and wherein said components (A) and (C) are blended such that 80 to 20 parts by weight of said component (A) and 20 to 80 parts by weight of said component (C) are present per 100 parts by weight of said blended components (A) and (C).

2. The composition of claim 1 wherein said polybutadiene is a blend of 60 to 90 parts by weight of (A) and 40 to 10 parts by weight of (B).

3. The composition of claim 1 wherein said polybutadiene is a blend of 70 to 30 parts by weight of (A) and 30 to 70 parts by weight of (C).

4. The rubber composition according to claim 1, which comprises 100 parts by weight of said polybutadiene blend, 10 to 60 parts by weight of said unsaturated carboxylic acid or a metal salt thereof, and 0.1 to 6 parts by weight of said peroxide.

5. The rubber composition according to claim 1, which comprises 100 parts by weight of said polybutadiene blend, 10 to 30 parts by weight of said unsaturated carboxylic acid wherein said unsaturated carboxylic acid is acrylic and/or methacrylic acid or a metal salt thereof, 10 to 70 parts by weight of said inorganic filler wherein said filler is zinc oxide, and 0.5 to 6 parts by weight of said organic peroxide.

* * * * *